(12) United States Patent
Shiratori et al.

(10) Patent No.: US 9,321,672 B2
(45) Date of Patent: Apr. 26, 2016

(54) CRYSTALLIZED GLASS HOUSING

(71) Applicant: ASAHI GLASS COMPANY, LIMITED, Chiyoda-ku (JP)

(72) Inventors: Makoto Shiratori, Haibara-gun (JP); Yuuichi Iida, Haibara-gun (JP); Kazuhide Kuno, Haibara-gun (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 92 days.

(21) Appl. No.: 14/155,801

(22) Filed: Jan. 15, 2014

(65) Prior Publication Data

US 2014/0194270 A1    Jul. 10, 2014

Related U.S. Application Data

(63) Continuation of application No. PCT/JP2012/067722, filed on Jul. 11, 2012.

(30) Foreign Application Priority Data

Jul. 15, 2011   (JP) ................. 2011-156684

(51) Int. Cl.
| | |
|---|---|
| C03C 10/12 | (2006.01) |
| C03C 10/00 | (2006.01) |
| C03C 10/16 | (2006.01) |
| C03C 4/02 | (2006.01) |
| C03C 3/118 | (2006.01) |
| C03C 3/083 | (2006.01) |
| C03C 3/097 | (2006.01) |
| C03C 4/00 | (2006.01) |

(52) U.S. Cl.
CPC ................ C03C 3/118 (2013.01); C03C 3/083 (2013.01); C03C 3/097 (2013.01); C03C 4/0028 (2013.01); C03C 4/02 (2013.01); C03C 10/0027 (2013.01); C03C 10/16 (2013.01)

(58) Field of Classification Search
CPC ................................................... C03C 10/0027
See application file for complete search history.

(56) References Cited

U.S. PATENT DOCUMENTS

| | | | | |
|---|---|---|---|---|
| 5,070,045 A | * | 12/1991 | Comte et al. ............... | 501/4 |
| 5,491,115 A | * | 2/1996 | Pfitzenmaier et al. ........... | 501/4 |
| 5,492,869 A | * | 2/1996 | Beall et al. ................. | 501/7 |
| 5,512,520 A | * | 4/1996 | Pfitzenmaier ............... | 501/7 |

(Continued)

FOREIGN PATENT DOCUMENTS

| | | |
|---|---|---|
| JP | 2001-35417 | 2/2001 |
| JP | 2001-316132 | 11/2001 |

(Continued)

OTHER PUBLICATIONS

U.S. Appl. No. 61/623,905, Beall et al. filed Apr. 13, 2012.*

(Continued)

*Primary Examiner* — David Sample
(74) *Attorney, Agent, or Firm* — Oblon, McClelland, Maier & Neustadt, L.L.P.

(57) ABSTRACT

To provide a crystallized glass housing excellent in properties suitable for a housing for an electronic device, such as shielding properties, high strength and production cost. A crystallized glass housing made of crystallized glass, said crystallized glass having a diffused transmittance of 15% or less in the entire light wavelength region of from 380 nm to 780 nm, as measured by using an integrated sphere.

10 Claims, 2 Drawing Sheets

(56) References Cited

U.S. PATENT DOCUMENTS

| | | | |
|---|---|---|---|
| 6,191,058 B1* | 2/2001 | Yamaguchi | 501/4 |
| 2002/0026932 A1 | 3/2002 | Mitra et al. | |
| 2002/0137618 A1* | 9/2002 | Goto et al. | 501/4 |
| 2003/0012961 A1* | 1/2003 | Goto et al. | 428/426 |
| 2005/0252503 A1* | 11/2005 | Siebers et al. | 126/1 R |
| 2007/0042889 A1* | 2/2007 | Apel et al. | 501/5 |
| 2008/0207424 A1* | 8/2008 | Aitken et al. | 501/10 |
| 2013/0274085 A1* | 10/2013 | Beall et al. | 501/32 |

FOREIGN PATENT DOCUMENTS

| | | |
|---|---|---|
| JP | 2001-348250 | 12/2001 |
| JP | 2003-300752 | 10/2003 |
| JP | 2005-63949 | 3/2005 |
| JP | 2009-61730 | 3/2009 |
| JP | 2009-537441 | 10/2009 |
| WO | WO 2010/002477 | 1/2010 |

OTHER PUBLICATIONS http://www.easyrgb.com/index.php?X=MATH&H=08#text8, visited Nov. 2, 2015, no author.*

International Search Report issued Sep. 18, 2012 in PCT/JP2012/067722 filed Jul. 11, 2012.

Office Action (W/English Translation) issued Apr. 2, 2013 in JP 2012-549185.

Office Action (W/English Translation) issued Jan. 8, 2013 in JP 2012-549185.

* cited by examiner

CRYSTALLIZED GLASS HOUSING

TECHNICAL FIELD

The present invention relates to a crystallized glass housing to be used as a member to accommodate an electronic device such as a communication device or an information device for portable use.

BACKGROUND ART

A housing for an electronic device such as a cell phone is suitably selected from one made of a material such as a resin or a metal in consideration of various factors such as decorativeness, scratch resistance, processability or cost, and used.

In recent years, it has been attempted to use glass which is not used heretofore, as a material for a housing (Patent Document 1). According to Patent Document 1, a housing body of an electronic device such as a cell phone is formed of glass, whereby it is possible to exhibit a specific decorative effect with good transparency.

PRIOR ART DOCUMENT

Patent Document

Patent Document 1: JP-A-2009-61730

DISCLOSURE OF INVENTION

Technical Problem

An electronic device is equipped with a display device such as a liquid crystal panel on the outer surface of the device. Such a display device tends to have high definition and high luminance, and accordingly, a backlight as a light source also tends to have high luminance. Light emitted from the light source is applied to the display device side, but it is sometimes multiply-reflected inside the device and reaches the backside surface of a housing accommodating the device. Further, even in the case of an organic EL (electro-luminescence) display requiring no light source, there is a concern over leakage of light from an electroluminescent element, likewise. When a metal is used as a material for a housing, there are no concerns, but if the above-mentioned glass having a transparency is used as the housing, there are concerns that the light emitted from a light source is transmitted through the housing and recognized from outside of the device. Accordingly, when glass is used for a housing, a light shielding means such as a coating film for imparting shielding property to visible light (hereinafter, referred to as "shielding property") to the glass is formed on the backside surface of the glass.

Along with the above-mentioned high luminance of a light source of the display device, in order to form a coating film having a sufficient shielding property on the backside (device side) surface of the glass, it is necessary to form a coating film thickly or to form a film composed of a plurality of layers, and thus the number of steps tends to increase and the cost tends to increase. Further, if a coating film is not uniformly formed, only a portion having a thin coating film tends to transmit light, thus leading to deterioration of appearance of a device such that the housing is brightly recognized locally. For example, a concave housing needs to have a uniform film formed on the entire surface on the concave side. However, a step of uniformly forming a coating film with a sufficient shielding property on the concave surface is complicated, and therefore cost tends to increase.

Especially, in the case of obtaining a housing colored white in appearance, there is a method of forming a white coating film layer on at least one surface of transparent glass as mentioned above. However, since a white coating material has a high light transmittance, it cannot provide a sufficient shielding property even when a white coating film layer is thick. Accordingly, a black coating film layer with high shielding property is laminated on the white coating film layer, but in this case, it is necessary to increase the thickness of the white coating film layer to an extent that the black coating film layer is not recognized. Thus, it costs very high to obtain a white housing having a high shielding property by using a white coating material.

Further, for an electronic device for portable use, such as a cell phone, a housing is required to have high strength in consideration of breakage due to drop impact at the time of use or contact damage due to a long-term use.

The object of the present invention is to provide a crystallized glass housing excellent in properties suitable for a housing which is to accommodate an electronic device, such as shielding property, high strength and production cost.

Solution to Problem

The present invention provides a crystallized glass housing (hereinafter, sometimes referred to as the crystallized glass housing of the present invention) made of crystallized glass, said crystallized glass having a diffused transmittance of 15% or less in the entire light wavelength region of from 380 nm to 780 nm, as measured by using an integrated sphere.

The above wording "to" indicating the numerical range is used for a meaning including the lower limit value and the upper limit value described before and after this wording, and the wording "to" described hereinbelow shows the same meaning unless otherwise specified.

Advantageous Effects of Invention

According to the present invention, it is possible to obtain a crystallized glass housing having a shielding property suitable for a housing for an electronic device, at a low cost, without necessity to provide a light shielding means such as a light shielding film to glass.

Further, the crystallized glass housing of the present invention is suitably used for use requiring high strength.

Moreover, the portable electronic device of the present invention is excellent in high strength, production cost and appearance.

BRIEF DESCRIPTION OF DRAWING

FIGS. 2A, 2B, 2C and 2D respectively correspond to Examples 2, 3, 4 and 6.

DESCRIPTION OF EMBODIMENTS

Figure 1:
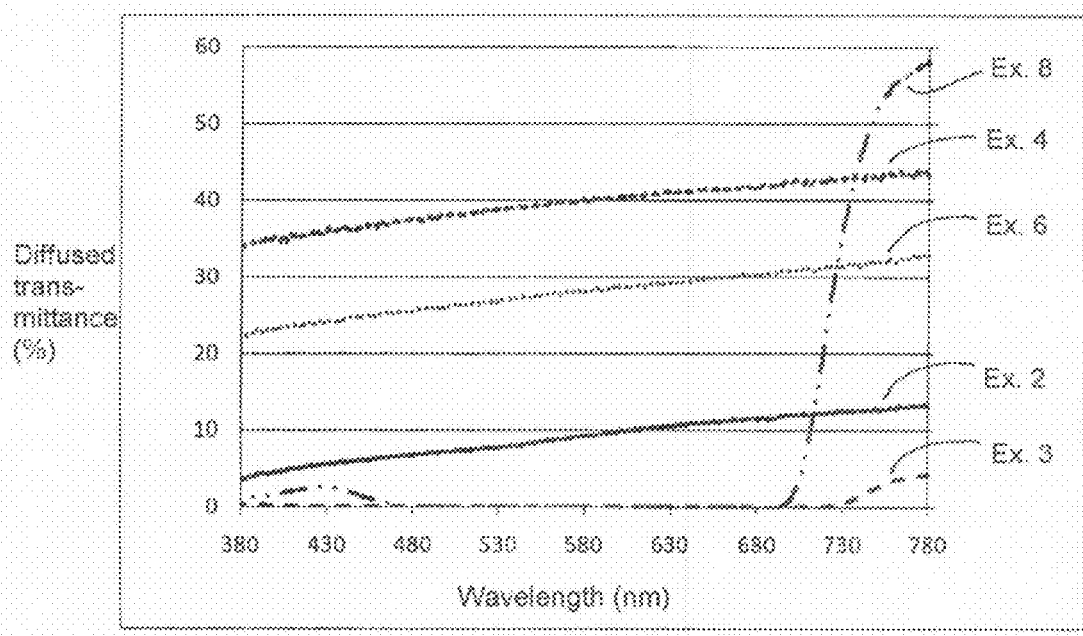
FIG. 1 is a graph illustrating a diffused transmittance of crystallized glass in each of Examples of the present invention and Comparative Examples, in the visible light region.
Figure 2A:
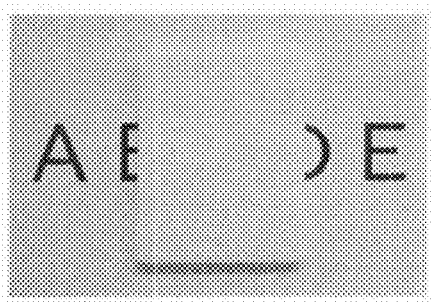
FIGS. 2A-2D are photographs illustrating an evaluation result of shielding property of crystallized glass in each of Examples of the present invention and Comparative Examples.
Figure 2B:
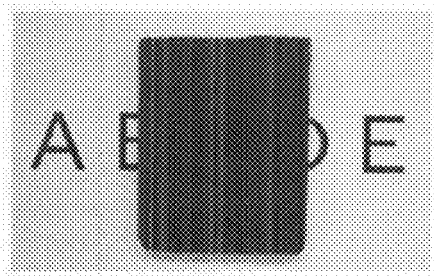
Figure 2C:
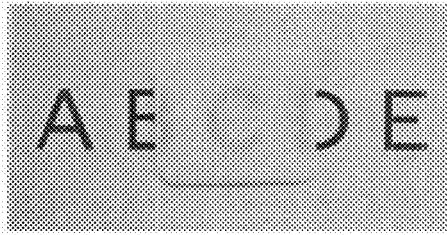
Figure 2D:
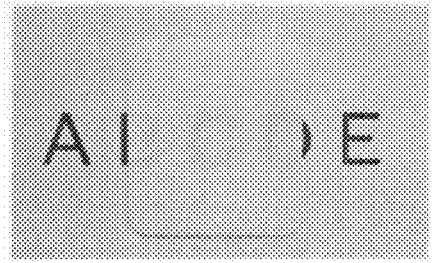

Now, a preferred embodiment of the crystallized glass housing of the present invention will be described.

The crystallized glass housing of the present invention is one which is to accommodate e.g. an electronic device. The outer surface of a cell phone is constituted such that a display device comprising a liquid crystal panel or an organic EL display and a control device comprising buttons or one having a display device and a control panel integrated such as a touch panel is arranged on one outer surface, and its periphery is surrounded by a casing material. The other outer surface is constituted by a panel. Further, a frame material is disposed at the thickness part of the device, between the one outer surface and the other outer surface. There may be a case where these casing material and frame material or these panel and frame material are integrally constituted.

As mentioned above, the crystallized glass housing of the present invention may be used for any of e.g. a casing material, a panel, a frame material, a housing and a case of an electronic device. Further, a shape thereof may be a flat plate shape, or a concave shape or a convex shape having an integrated structure of a casing material and a frame material or a panel and a frame material. That is, the crystallized glass housing of the present invention is one including the above various shapes.

A light source of a display device arranged inside an electronic device is constituted by one emitting white light, such as a light emitting diode, an organic EL or CCFL. Further, there is also one such as an organic EL display having a light emitting element capable of emitting e.g. white light, without using the above light source. If such a white light leaks outside the device through the crystallized glass housing, appearance tends to be poor. Accordingly, it is necessary that a crystallized glass housing has a property to securely shields white light.

In order to have the property to securely shields white light, the crystallized glass housing of the present invention is made of crystallized glass having a diffused transmittance of 15% or less in the entire light wavelength region of from 380 nm to 780 nm, as measured by using an integrated sphere.

The above white light emitted from a light source is recognized as white by combining lights having a plurality of wavelengths in a visible region by using a phosphor. Accordingly, by using, as a housing, a crystallized glass having optical properties with a diffused transmittance of 15% or less in the entire light wavelength region of from 380 nm to 780 nm as a wavelength in a visible region, as measured by using an integrated sphere, it is possible to shield white light without separately providing a shielding means. If the crystallized glass has optical properties with a diffused transmittance of more than 15% in the entire light wavelength region of from 380 nm to 780 nm, as measured by using an integrated sphere, it is impossible to obtain a desired shielding property even when it is glass having a sufficient thickness for a housing, and therefore a crystallized glass housing may transmit white light. Further, if the crystallized glass housing is formed into a concave shape or a convex shape, the housing may transmit white light at the thinnest portion. In the entire light wavelength region of from 380 nm to 780 nm, the crystallized glass has a diffused transmittance of preferably at most 12%, more preferably at most 10%, as measured by using an integrated sphere.

The above diffused transmittance of the crystallized glass is not a value calculated to a specific plate thickness, but a diffused transmittance at a prescribed portion of a crystallized glass housing to be used for an electronic device. It is because the object of the crystallized glass housing of the present invention is to impart a shielding property inside the device, therefore the diffused transmittance at the time of using it as a housing is important, and further a housing is not always used at a specific thickness. Accordingly, even when crystallized glass has the same composition and the same crystallization conditions, one satisfies the above diffused transmittance and the other does not satisfy it, depending upon the plate thickness. Further, in a case where the crystallized glass housing is e.g. a flat plate such as a panel, the crystallized glass housing is used at a thickness of at most 3 mm in many cases although it depends upon parts to be used.

The reason why crystallized glass is used for the crystallized glass housing of the present invention is as follows.

Crystallized glass is one having fine crystal particles precipitated inside glass, which has properties with high mechanical strength or hardness and excellent heat resistance, electrical characteristics and chemical resistance. A crystallized glass is colored white in appearance by diffusing, reflecting or scattering light at the interface of crystal particles in the glass. The crystallized glass housing of the present invention is one which makes it difficult to recognize white light transmitted through glass at the glass surface side by using light scattering at crystallized glass.

Further, regarding the above optical properties of the crystallized glass, for the purpose of evaluating how to transmit brightness through the crystallized glass, it is important to carry out a method of measuring a diffused transmittance employing an integrated sphere to carry out measurement including the above scattered light from the crystallized glass. Moreover, in usual transmittance measurement (linear transmittance measurement), measurement is carried out by using parallel light without considering scattered light, and therefore it is difficult to evaluate the shielding property of the crystallized glass housing, as an object of the present invention.

Regarding the crystallized glass housing, in order to obtain high shielding property, it is important to lower a diffused transmittance including the scattered light of the crystallized glass. Accordingly, it is preferred that crystallized glass has a crystallite diameter exceeding 1,000 Å, as calculated by Scherrer's formula in X-ray diffraction measurement of the crystallized glass, whereby it is possible to lower the diffused transmittance including the scattered light of the crystallized glass by scattering light having a wavelength within the visible range at the interface of crystal particles, and it is thereby possible to increase the shielding property of the crystallized glass housing. If the crystallized glass has a crystallite diameter of 1,000 Å or less, as calculated by Scherrer's formula in X-ray diffraction measurement, the diffused transmittance including the scattered light from the crystallized glass tends to be high, whereby the shielding property of the crystallized glass housing tends to be insufficient.

Moreover, in the X-ray diffraction measurement of the crystallized glass, even when a crystal precipitated has a single phase, a plurality of diffraction peaks corresponding to a plurality of crystal phases are observed. As a crystallite diameter as calculated by Scherrer's formula in the present invention, among the respective crystallite diameters as calculated from a plurality of peaks by Scherrer's formula, the largest one is taken as an object. Further, in the case of crystallized glass having a plurality of crystals precipitated, a diffraction peak of a main crystal is taken as an object.

It is preferred that the crystallized glass housing of the present invention shows white reflected light in appearance by constituting it by crystallized glass. It is thereby possible to obtain a crystallized glass housing showing white in appearance and having high shielding property at a low cost, without necessity to provide a light shielding means. Further, in this specification, "white" indicates that, when reflected light of a C light source to the crystallized glass formed into a flat plate having a thickness of 2 mm is measured, the reflected light is within a range of an area surrounded by a straight line passing through a point A (x: 0.2500, y: 0.2500) and a point B (x: 0.4000, y: 0.3500), a straight line passing through the point B (x: 0.4000, y: 0.3500) and a point C (x: 0.4000, y: 0.4000), a straight line passing through the point C (x: 0.4000, y: 0.4000) and a point D (x: 0.2500, y: 0.3000), and a straight line passing through the point D (x: 0.2500, y: 0.3000) and the point A (x: 0.2500, y: 0.2500) in CIE chromaticity coordinates. Here, the above points on the respective lines are also within the range of the above region surrounded.

With respect to the crystallized glass housing of the present invention, the crystallized glass contains, as a color component, at least one member selected from the group consisting of metal elements of Co, Mn, Fe, Ni, Cu, Cr, V, Bi, Er, Sn, Ce, Pr, Eu, Nd and Ag in an amount of from 0.1 to 10% as represented by mole percentage based on metal oxides, whereby it is possible to obtain a crystallized glass housing having high shielding property and showing a reflection color with a desired shade other than white.

By incorporating, as color components, $Co_3O_4$ in an amount of from 0 to 3%, CuO in an amount of from 0 to 8% and $Co_3O_4$+CuO in an amount of from 0.01 to 8%, as represented by mole percentage based on oxides, to crystallized glass, it is possible to obtain crystallized glass showing a reflection color with a blue color tone.

By incorporating, as color components, $Fe_2O_3$ in an amount of from 0 to 5%, $V_2O_5$ in an amount of from 0 to 5%, $Cr_2O_3$ in an amount of from 0 to 5%, CuO in an amount of from 0 to 8%, $Pr_6O_{11}$ in an amount of from 0 to 3% and $Fe_2O_3$+$V_2O_5$+$Cr_2O_3$+CuO+$Pr_6O_{11}$ in an amount of from 0.01 to 8% as represented by mole percentage based on oxides, to crystallized glass, it is possible to obtain crystallized glass showing a reflection color with a green color tone.

By incorporating, as color components, $CeO_2$ in an amount of from 0 to 5%, $V_2O_5$ in an amount of from 0 to 5%, NiO in an amount of from 0 to 5%, $Bi_2O_3$ in an amount of from 0 to 10%, $Eu_2O_3$ in an amount of from 0 to 3% and $CeO_2$+$V_2O_5$+NiO+$Bi_2O_3$+$Eu_2O_3$ in an amount of from 0.01 to 10% as represented by mole percentage based on oxides, to crystallized glass, it is possible to obtain crystallized glass showing a yellow or brown color tone.

By incorporating, as color components, $MnO_2$ in an amount of from 0 to 10%, $Er_2O_3$ in an amount of from 0 to 3%, $Nd_2O_3$ in an amount of from 0 to 3%, $WO_3$ in an amount of from 0 to 10% and $MnO_2$+$Er_2O_3$+$Nd_2O_3$+$WO_3$ in an amount of from 0.01 to 10% as represented by mole percentage based on oxides, to crystallized glass, it is possible to obtain crystallized glass showing a reflection color with a purple or pink color tone.

By incorporating, as color components, $Cu_2O$ in an amount of from 0 to 3%, $Ag_2O$ in an amount of from 0 to 6% and $Cu_2O$+$Ag_2O$ in an amount of from 0.001 to 6% as represented by mole percentage based on oxides, to crystallized glass, and further by incorporating as components other than the above color components for the crystallized glass, SnO in an amount of from 0 to 3%, $Sb_2O_3$ in an amount of from 0 to 5% and SnO+$Sb_2O_3$ in an amount of from 0 to 5%, whereby it is possible to obtain crystallized glass showing a reflection color with a red color tone.

By incorporating the above color components to crystallized glass, it is possible to obtain a crystallized glass housing having high shielding property despite the bright color tone.

The reason is such that crystal particles in the crystallized glass contribute to shielding property, and therefore the shielding property is not influenced even in the case of light-colored crystallized glass containing a small amount of color components. If color components are incorporated into amorphous glass so as to obtain the same shielding property as in the present invention, light is shielded only by absorption of light, and therefore a color of reflected light becomes too dense dark color to distinguish a color.

On the other hand, in a case where the crystallized glass of the present invention is used, light is scattered by a white crystal in the presence of light, and therefore it is visually observed as a bright color tone by adequate reflection while suppressing transmission of light. Specifically, regarding crystallized glass containing the above color components, when transmitted light of a C light source to the above crystallized glass formed into a flat plate having a thickness of 2 mm is measured, the transmitted light has x of from 0.3 to 0.4 and y of from 0.3 to 0.4 in CIE chromaticity coordinates. That is, the crystallized glass is one which hardly transmits light.

Further, when reflected light of a C light source to the crystallized glass formed into a flat plate having a thickness of 2 mm is measured, the reflected light has x and y outside the range of the x and y of from 0.3 to 0.4 respectively of the transmitted light in CIE chromaticity coordinates. That is, the color tone of appearance (looks) does not show a dense color, but shows an adequate color tone derived from the color components.

Thus, it is possible to obtain a crystallized glass housing having high shielding property and excellent appearance showing a bright color tone. Further, in the case of obtaining a crystallized glass housing showing a dense color tone, the position on the CIE chromaticity coordinates composed of the above reflection color tone x and the reflection color tone y of the crystallized glass may be within the above-mentioned ranges of the transmission color tone x of from 0.3 to 0.4 and the transmission color tone y of from 0.3 to 0.4.

As the crystallize glass, crystallized glass having any composition or main crystal may be used so long as the transmitted light can be scattered. As a specific example, crystallized glass having β-quartz solid solution, β-spodumene solid solution, lithium disilicate or enstatite as a main crystal, or milky glass having e.g. $CaF_2$ or NaF as a main crystal may, for example, be mentioned. Especially, the crystallized glass having lithium disilicate as a main crystal can suitably be used for the crystallized glass housing of the present invention since it usually has high whiteness.

Further, crystallized glass has characteristics such as excellent mechanical strength. Accordingly, it is suitably used for a crystallized glass housing for an electronic device for portable use such as a cell phone which requires high strength to the housing.

The crystallized glass may be subjected to chemical tempering treatment to impart higher strength.

The chemical tempering treatment is a method of forming a compressive stress layer on the glass surface to impart high strength to glass. Particularly, it is a method of ion exchanging at a temperature of a glass transition point or lower to exchange alkali metal ions (typically, Li ions or Na ions) having a small ion diameter on the surface of a glass plate to alkali ions having a larger ion diameter. Typically, it is a method of exchanging Li ions with Na ions or K ions, or a method of exchanging Na ions with K ions.

The method of chemical tempering treatment is not particularly limited so long as Li ions of $Li_2O$ or Na ions of $Na_2O$ in the glass surface layer can be ion-exchanged with Na ions or K ions in a molten salt, but it may, for example, be a method of immersing glass in a molten salt of potassium nitrate ($KNO_3$) heated.

Conditions for formation of a chemically tempered layer (surface compressive stress layer) having a desired surface compressive stress on glass vary depending upon the thickness of the glass, and typically, glass is immersed in a $KNO_3$ molten salt at 400 to 550° C. for from 2 to 20 hours.

The crystallized glass to be used for the crystallized glass housing of the present invention may have a compressive stress layer on the surface by chemical tempering treatment.

In production of glass to be used for the housing application, regardless of whether the glass is formed into a flat plate or other shape, a polishing step is carried out in some cases. In the step of polishing glass, the particle size of abrasive grains to be used for polishing at the final stage is typically from 2 to 6 µm, and it is considered that microcrackings of at most 5 µm are finally formed on the glass surface by such abrasive grains. In order to achieve an effect of improving the strength by chemical tempering, a surface compressive stress layer which is deeper than the microcrackings formed on the glass surface is required, and accordingly the depth of the surface compressive stress layer formed by chemical tempering is preferably at least 6 µm. Further, if the glass surface gets a scar which is deeper than the depth of the surface compressive stress layer at the time of use, it may lead to breakage of glass, and accordingly the surface compressive stress layer is preferably deep, more preferably at least 10 µm, further more preferably at least 20 µm, typically at least 30 µm.

On the other hand, if the surface compressive stress layer is deep, the internal tensile stress is great, and impact at the time of breakage will be great. That is, if the internal tensile stress is great, the glass tends to break into pieces and fly off when broken. As a result of experiments conducted by the present inventors, in the case of glass having a thickness of at most 2 mm, if the depth of the surface compressive stress layer exceeds 70 µm, flying when glass is broken tends to be remarkable. Accordingly, in the crystallized glass housing of the present invention, the depth of the surface compressive stress layer is preferably at most 70 µm. In a case where the glass is used as a crystallized glass housing, depending on an electronic device to be accommodated, for example, for application to e.g. a panel which is highly likely to have scars on its surface by contact, it is considered to make the surface compressive stress layer thin for safety's sake, and the depth is more preferably at most 60 µm, furthermore preferably at most 50 µm, typically at most 40 µm.

Further, the depth of the surface compressive stress layer of the crystallized glass formed by chemical tempering treatment can be measured by using an EPMA (Electron Probe Micro Analyzer). For example, in a case where a sodium component in a glass surface layer is ion-exchanged with a potassium component in the molten salt by chemical tempering treatment, a potassium ion concentration in a depth direction of crystallized glass is analyzed by EPMA, and a depth of potassium ionic diffusion depth obtained by measurement is regarded as a depth of the surface compressive stress layer. Further, in a case where a lithium component in the glass surface layer is ion-exchanged with a sodium component in the molten salt by chemical tempering treatment, a sodium ion concentration in a depth direction of crystallized glass is analyzed by EPMA, and a sodium ionic diffusion depth obtained by measurement is regarded as a depth of the surface compressive stress layer.

In a case where crystallized glass is chemically tempered, it is necessary that the above-mentioned $Li_2O$ or $Na_2O$ is present in a matrix phase remaining as glass after crystallization. In order to achieve higher strength, it is necessary to increase the content of $Li_2O$ or $Na_2O$, in such a case, the thermal expansion coefficient increases, and therefore if the thermal expansion coefficient of crystals precipitated is small, a large stress is generated in the glass. Accordingly, in the case of chemical tempering, a lithium disilicate type, enstatite type or nepheline type crystallized glass having a high thermal expansion coefficient of its crystals is preferred.

Further, crystals present in a surface region of crystallized glass may be transferred thereby to form a compressive stress layer on the surface of glass. For example, in crystallized glass having β-quartz solid solution precipitated as a main crystal, e.g. an inorganic sodium salt, a sodium salt of an organic acid or an inorganic calcium salt is suitably used as a crystal transition assistant to carry out crystal transition of the β-quartz solid solution to β-spodumene solid solution only in the surface area, whereby, as in the case of chemical tempering treatment, a compressive stress layer is formed on the surface alone thereby to obtain a crystallized glass housing having a higher strength.

Further, glass having a thermal expansion coefficient smaller than crystallized glass is thinly applied on the surface, whereby it is possible to impart a surface compressive stress by the difference of thermal expansion. In a case where clear glass is used, it is also possible to obtain an effect of improving an appearance by surface reflection and rear-side reflection on the glass applied thereon.

A process for producing crystallized glass is not particularly limited, but for example, appropriate amounts of various glass starting materials are prepared and heated to about 1,500 to about 1,800° C. and melted, the melt is homogenized by defoaming, stirring or the like, and formed into e.g. a plate by a known downdraw method, pressing method, rollout method or the like, or cast to be formed into a block, followed by annealing, and then processed into an optional shape. Further, as a crystal precipitation step, the resulting product is held at a temperature of from 400 to 900° C. for from 30 minutes to 6 hours to precipitate a crystal nucleus and a main crystal. The crystal precipitation step is usually a two step heating treatment of nucleus forming treatment at a temperature of from 400 to 600° C. and then crystallization at a temperature of from 600 to 900° C., but it may be a single step heating treatment so as to let the crystal grow largely. Thereafter, it is subjected to cutting, polishing and the like, so as to have a desired shape. Further, in a case where crystallized glass is subjected to chemical tempering treatment, after crystals are precipitated, it is processed into a desired shape, and thereafter the above-mentioned chemical tempering treatment is carried out. Further, in a case where crystal transition is carried out in the surface area of crystallized glass, a crystal transition assistant is applied on the surface of glass on which the crystal precipitation step is carried out, followed by heating treatment. Then, the glass is annealed at e.g. room temperature.

The crystallized glass housing of the present invention may be formed into not only a flat plate but also a concave or a convex shape. In such a case, glass formed into e.g. a flat plate or a block may be press molded in a reheated and molten state. Further, glass may be molded into a desired shape by letting molten glass flow over a direct press mold to carry out press molding, that is direct pressing. Moreover, a portion corresponding to a display device or a connector of an electronic device is processed at the same time with the press molding, or the portion may be cut after the press molding. Here, the step of precipitating crystals in the glass is preferably carried out after the above press-molding.

The crystallized glass housing of the present invention may suitably be used for a portable electronic device. The portable electronic device is a concept including a communication device and an information device for portable use. For example, the communication device may, for example, be a cell phone, PHS (Personal Handy-phone System), a smart phone, PDA (Personal Data Assistance) or PND (Portable Navigation Device, Portable Car Navigation System) as a communication terminal, or a portable radio, a portable television or a one-segment receiver as a broadcasting receiver. Further, the information device may, for example, be a digital camera, a video camera, a portable music player, a sound recorder, a portable DVD player, a portable game machine, a laptop, a tablet PC, an electronic dictionary, an electronic notebook, an electronic book reader, a portable printer or a portable scanner. However, it is not limited to these examples.

By using the crystallized glass housing of the present invention for these portable electronic device, it is possible to obtain a portable electronic device having high strength and appearance.

EXAMPLES

Now, the present invention will be described in detail with reference to Examples, but it should be understood that the present invention is by no means restricted to such specific Examples.

In Examples 1 to 8 and 14 (Examples 1 to 3 and 14 are Examples of the present invention and Examples 4 to 8 are Comparative Examples) in Table 1, commonly used glass starting materials such as oxides, hydroxides, fluorides, carbonates and nitrates were properly selected so as to have compositions as shown in Table 1 as represented by mole percentage, weighed to obtain 100 ml of glass. Further, the value of $SO_3$ in Table 1 represents a calculated value of $SO_3$ remaining in glass after sodium sulfate ($Na_2SO_4$) was added to the glass starting material and the sodium sulfate was decomposed.

Then, the starting material mixture was put in a platinum crucible, the platinum crucible was put in a resistance heat type electric furnace at a temperature of from 1,500 to 1,600° C. After the starting materials were melted down in about 0.5 hour, the mixture was melted for 5 hours, defoamed and cast in a mold of about 40 mm×about 40 mm×about 2 mm in height preliminarily heated at about 300° C., then kept in the vicinity of an annealing point for 1 hour, and annealed at a rate of about 1° C./min to obtain a glass block. Both surfaces of this glass block were polished to have a thickness of about 3 mm or about 1.5 mm. Then, the crystallization treatment in Table 1 was carried out to precipitate crystals. Thereafter, both surfaces of the crystallized glass were polished so as to have a thickness of 2 mm or 0.7 mm to obtain a sample. Crystal seeds precipitated in the glass by crystallization are shown in Table 1. Further, regarding the crystallization treatment in Table 1, in a case where two values are described in one column, the upper side value represents a case of heat treatment for forming nucleus, and the lower side value represents a case of heat treatment for precipitating a crystal, and these heat treatments were carried out continuously. In the crystallization treatment where only one value was present (Example 7), no heat treatment for forming the nucleus was carried out and only heat treatment for precipitating crystals was carried out. Further, in Example 6 where crystals were precipitated in the step of annealing glass, no crystallization treatment was carried out.

TABLE 1

| mol % | Ex. 1 | Ex. 2 | Ex. 3 | Ex. 4 | Ex. 5 | Ex. 6 | Ex. 7 | Ex. 8 | Ex. 14 |
|---|---|---|---|---|---|---|---|---|---|
| $SiO_2$ | 72.7 | 72.3 | 72.0 | 72.3 | 73.7 | 61.6 | 58.4 | 73.4 | 50.4 |
| $Al_2O_3$ | 2.0 | 2.2 | 2.2 | 2.2 | 4.0 | 3.5 | 3.3 | 4.0 | 22.7 |
| $Li_2O$ | 22.7 | 23.1 | 23.0 | 23.1 | 18.8 | 0.0 | 0.0 | 18.8 | 0.0 |
| $Na_2O$ | 0.0 | 0.0 | 0.0 | 0.0 | 0.0 | 2.8 | 7.0 | 0.0 | 12.5 |
| $K_2O$ | 1.6 | 1.8 | 1.8 | 1.8 | 1.7 | 2.9 | 0.0 | 1.7 | 7.5 |
| $B_2O_3$ | 0.0 | 0.0 | 0.0 | 0.0 | 0.0 | 3.8 | 2.4 | 0.0 | 0.0 |
| CaO | 0.0 | 0.0 | 0.0 | 0.0 | 0.0 | 15.3 | 14.5 | 0.0 | 0.0 |
| $ZrO_2$ | 0.0 | 0.0 | 0.0 | 0.0 | 0.8 | 0.0 | 0.0 | 0.8 | 0.0 |
| $TiO_2$ | 0.0 | 0.0 | 0.0 | 0.0 | 0.0 | 0.0 | 0.0 | 0.0 | 6.9 |
| $P_2O_5$ | 0.9 | 0.5 | 0.5 | 0.5 | 0.7 | 0.0 | 0.0 | 0.7 | 0.0 |
| F | 0.0 | 0.0 | 0.0 | 0.0 | 0.0 | 10.1 | 14.5 | 0.0 | 0.0 |
| $Sb_2O_3$ | 0.1 | 0.1 | 0.0 | 0.1 | 0.1 | 0.0 | 0.0 | 0.0 | 0.0 |
| $SO_3$ | 0.0 | 0.0 | 0.1 | 0.0 | 0.0 | 0.0 | 0.0 | 0.1 | 0.0 |
| $Co_3O_4$ | 0.0 | 0.0 | 0.5 | 0.0 | 0.0 | 0.0 | 0.0 | 0.5 | 0.0 |
| Crystallization treatment | 520° C. × 1 h  800° C. × 3 h | 520° C. × 1 h  800° C. × 3 h | 520° C. × 2 h  800° C. × 2 h | 520° C. × 1 h  800° C. × 3 h | 520° C. × 1 h  800° C. × 3 h | — | 750° C. × 2 h | 520° C. × 2 h  800° C. × 2 h | 850° C. × 4 h  1,100° C. × 4 h |
| Cystal seed | $Li_2Si_2O_5$, $SiO_2$ | $Li_2Si_2O_5$, $SiO_2$ | $Li_2Si_2O_5$, $SiO_2$ | $Li_2Si_2O_5$, $SiO_2$ | $Li_2Si_2O_5$, $SiO_2$ | $CaF_2$ | $CaF_2$ | $Li_2Si_2O_5$, $SiO_2$ | $Na(NaK)_3Al_4Si_4O_{32}$ |
| Plate thickness | 2.0 mm | 2.0 mm | 2.0 mm | 0.7 mm | 0.7 mm | 0.7 mm | 0.7 mm | 2.0 mm | 1.0 mm |
| Color of appearance | White | White | Blue | White | White | White | White | Indigo blue | White |
| Shielding property (I) | ○ | ○ | ○ | x | x | x | x | — | ○ |
| Shielding property (II) | ○ | ○ | ○ | x | x | x | x | — | ○ |
| x | — | 0.3542 | — | — | — | 0.3180 | 0.3334 | — | — |
| y | — | 0.3503 | — | — | — | 0.3242 | 0.3346 | — | — |

Regarding the crystallized glass obtained, the transmittance, the shielding property (I) and the shielding property (II) were evaluated.

As for the transmittance, a diffused transmittance was measured by using an integrated sphere, in the wavelength region of from 380 nm to 780 nm, by using an ultraviolet/visible/near infrared spectrophotometer (V-570, manufactured by JASCO Corporation). The diffused transmittance of each sample in Examples 2 to 4, 6 and 8 was measured and shown in FIG. 1.

The shielding property (I) is measured whether visible light derived from a light source inside a device can be transmitted through a housing and be recognized. The evaluation method is as follows. As the light source, cold light (manufactured by HOYA-SCHOTT, MEGALIGHT 100) was used. A quantity of light from the light source is controlled to be minimum, and a sample was provided 20 mm away from the tip of a light guide. By using this device, it was confirmed whether light can be recognized from the side opposite to the side irradiated with light. When the light is not recognized, it is determined that the sample has a shielding property (∘), and when light is recognized, it is determined that the sample has no shielding property (×). A result of each sample is shown in Table 1.

The shielding property (II) is measured whether, when a housing is irradiated with visible light emitted from an outside light source, the visible light is reflected on a component inside the device and inside of the device can be recognized through the housing. The evaluation method is as follows. Ten sheets of white wood free paper (copy paper) were laminated, and an optional letter (size: 36 point, font: MS Gothic, color: black) was printed thereon by a laser printer. A sample was put on the letter printed, and it was visually confirmed whether the letter can be observed through the sample. When the presence of the letter cannot be recognized, it is determined that the sample has a shielding property (∘), and when the presence of the letter can be recognized, it is determined in Example 2 provides a reflected light within a range of the above-mentioned area surrounded by point A, point B, point C and point D in the CIE chromaticity coordinates, and it is found to have white appearance.

Figure 3:
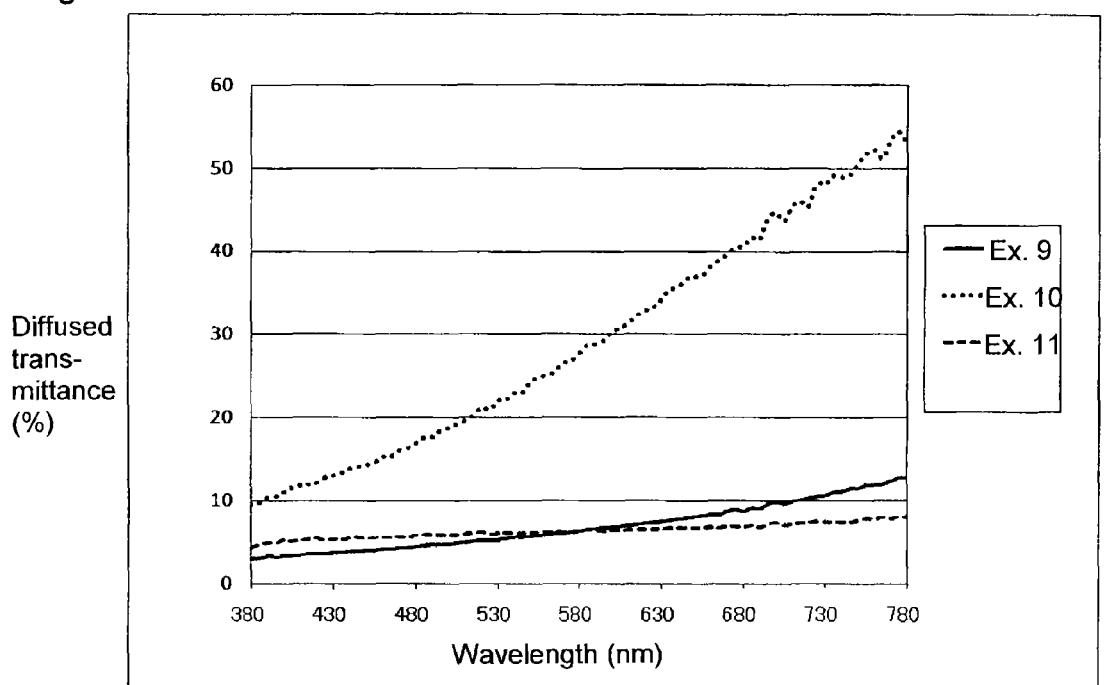
FIG. 3 is a graph illustrating a diffused transmittance for every crystallization condition of crystallized glass in each of Examples of the present invention and Comparative Examples, in the visible light region.

Then, a relation between a shielding property and a crystallized state of crystallized glass was studied. In Examples 9 to 11 (Examples 9 and 11 are Examples of the present invention, and Example 10 is Comparative Example) in Table 2, glass having the same composition as the crystallized glass shown in Example 1 in Table 1 was melted and molded except that only the crystallization conditions (nucleation treatment and crystallization treatment) were changed, and a relation between a shielding property and a size (Scherrer diameter) of a crystals precipitated when these conditions were changed was studied. Further, the evaluation methods of the shielding property are the same as the above-mentioned methods. In Table 2, the crystallization conditions, the size (Scherrer diameter) of crystals and the shielding property are shown. Further, in FIG. 3, the transmittance of a sample in each of Examples 9 to 11 is shown. The Scherrer diameter is a crystallite diameter of crystallized glass obtained from the Scherrer's formula, by measuring crystals precipitated in the crystallized glass by using an X-ray diffraction apparatus. Here, as the X-ray diffraction apparatus, RINT-1100 (manufactured by Rigaku Corporation, X-ray optical system: focusing optical system (θ-2θ), X-ray tube bulb used: Cu—Kα, λ=1.541 Å) was used with a Scherrer constant K: 0.94. Further, regarding the measurement result, a Scherrer diameter was calculated by using a powdery X-ray diffraction pattern general analysis software JADE.

TABLE 2

| | Nucleation treatment | | Crystallization treatment | | X-Ray diffraction apparatus | | | Shielding property (I) | Shielding property (II) |
|---|---|---|---|---|---|---|---|---|---|
| | Nucleation temperature [° C.] | Nucleation time [hour] | Crystallization temperature [° C.] | Crystallization time [hour] | Diffraction angle (2θ) [°] | Half-width [°] | Scherrer diameter [Å] | | |
| Ex. 9 | 520 | 2 | 850 | 3 | 23.845 | 0.119 | 1,243 | ∘ | ∘ |
| Ex. 10 | 520 | 2 | 700 | 3 | 23.73 | 0.177 | 836 | x | x |
| Ex. 11 | No nucleation | | 800 | 3 | 24.321 | 0.115 | 1,300 | ∘ | ∘ | that the sample has no shielding property (×). A result of each sample is shown in Table 1. Further, regarding the samples of Examples 2 to 4 and 6, the above evaluation results of the shielding property were photographed by a digital still camera, and shown in FIGS. 2A-2D. FIGS. 2A, 2B, 2C and 2D respectively correspond to Examples 2, 3, 4 and 6.

From the results of the above diffused transmittance, the shielding property (I) and the shielding property (II), it is found that the crystallized glass has a shielding property when a diffused transmittance measured by using an integrated sphere is 15% or less, in the wavelength region of from 380 nm to 780 nm. That is, when a crystallized glass housing having such a shielding property is used as a housing to accommodate an electronic device, it is possible to shield light inside of the device or a state inside the device so as not to be recognized from outside the device.

Further, regarding the sample in Example 2, x and y in CIE chromaticity coordinates at the time when reflected light of a C light source to the sample formed into a flat plate having a thickness of 2 mm was measured, are shown in Table 1. Here, the reflected light was measured by using a chroma meter (manufactured by KONICA MINOLTA, INC., CR-300) in an Yxy mode (CIE 1931 XYZ colorimetric system). The sample From the results in Table 2, it is found that crystallized glass has a shielding property depending on the crystallization conditions, that is, when a size of a crystallite diameter exceeds 1,000 Å.

Then, crystallized glass having a color component added and amorphous glass having a color component added were studied on shielding property and color tones of transmitted light and reflected light. As the crystallized glass having a color component added, a sample showing blue in appearance in Example 3 was used. As the amorphous glass having a color component added (Example 12), glass showing blue in appearance composed of $SiO_2$: 64.3%, $Al_2O_3$: 8.0%, $Na_2O$: 12.5%, $K_2O$: 4.0%, MgO: 10.5%, CuO: 1.0% and $ZrO_2$: 0.5% as represented by mole percentage was used.

Figure 4:
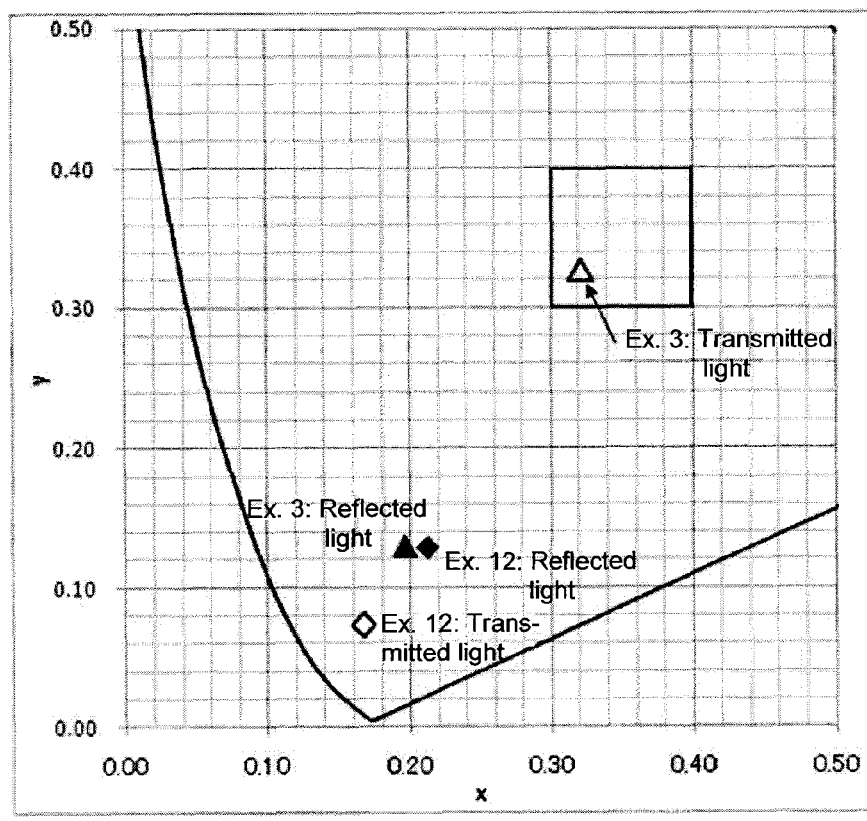
FIG. 4 is a graph illustrating chromaticity by transmitted light or reflected light in each of Examples of the present invention and Comparative Examples.

Regarding samples in Examples 3 and 12, x and y in CIE chromaticity coordinates at the time when transmitted light or reflected light of a C light source to samples molded into a flat plate having a thickness of 2 mm was measured, are shown in FIG. 4. Further, the reflected light was measured by using a chroma meter (manufactured by KONICA MINOLTA, INC., CR-300) in Yxy mode (CIE 1931XYZ colorimetric system). Further, as for the transmitted light, a transmittance was measured by using an ultraviolet/visible/near infrared spectrophotometer (manufactured by JASCO Corporation, V-570), and the data was calculated to CIE 1931XYZ colorimetric system based on JIS Z8722: 2000 (method of color measurement-reflecting and transmitting objects).

As shown in FIG. 4, the reflected lights showed almost the same color tones in Example 3 and Example 12, but in the case of the transmitted light, in Example 3, it has high shielding property since the light is scattered by crystals, whereby x is within a range of from 0.3 to 0.4 and y is within a range of from 0.3 to 0.4 in chromaticity diagram, and on the other hand, in Example 12, it has a shielded property only by absorption of a color component, whereby it resulted in showing a bright blue in the case of the transmitted light. Accordingly, it is found that a crystallized glass housing having high light shielding property and further being recognized as a bright color tone can be obtained by adding a color component to crystallized glass.

Then, a sample obtained by subjecting crystallized glass to chemical tempering treatment was prepared, and the mechanical strength difference depending on whether the treatment was carried out or not was confirmed. The crystallized glass in Example 1 was immersed in a $KNO_3$ molten salt (100%) at 400° C. for 2 hours to carry out chemical tempering treatment. This crystallized glass subjected to chemical tempering treatment is regarded as glass in Example 13.

In each of Examples 1 and 13, the resulting sample was measured under the measurement conditions at a lower span of 30 nm, an upper span of 10 mm and a crosshead speed of 0.5 mm/min, in accordance with JIS R1601: 2008 (bending strength test method of fine ceramics at room temperature) to calculate a stress at break. Further, in Examples 1 and 13, the bending strengths of fifteen samples were measured. As a result, it is found that the crystallized glass (Example 1) has a stress at break of 212 MPa on average and has a high bending strength. Further, the crystallized glass (Example 13) which was subjected to chemical tempering treatment has a stress at break of 271 MPa on average, and therefore it is found that the crystallized glass has a bending strength higher than the above-mentioned crystallized glass.

INDUSTRIAL APPLICABILITY

The present invention provides a crystallized glass housing having high shielding property and strength and being excellent in production cost and appearance, as a housing to accommodate an electronic device such as a portable electronic device.

This application is a continuation of PCT Application No. PCT/JP2012/067722, filed on Jul. 11, 2012, which is based upon and claims the benefit of priority from Japanese Patent Application No. 2011-156684 filed on Jul. 15, 2011. The contents of those applications are incorporated herein by reference in its entirety.

What is claimed is:

1. A crystallized glass housing made of crystallized glass, which is to accommodate an electronic device, said crystallized glass having a diffused transmittance of 15% or less in the entire light wavelength region of from 380 nm to 780 nm, as measured by using an integrated sphere, wherein the crystallized glass is white in appearance, and when reflected light of a C light source to the crystallized glass formed into a flat plate having a thickness of 2 mm is measured, the reflected light is within a range of an area surrounded by a straight line passing through a point A (x: 0.2500, y: 0.2500) and a point B (x: 0.4000, y: 0.3500), a straight line passing through the point B (x: 0.4000, y: 0.3500) and a point C (x: 0.4000, y: 0.4000), a straight line passing through the point C (x: 0.4000, y: 0.4000) and a point D (x: 0.2500, y: 0.3000), and a straight line passing through the point D (x: 0.2500, y: 0.3000) and the point A (x: 0.2500, y: 0.2500) in CIE chromaticity coordinates.

2. The crystallized glass housing according to claim 1, wherein the crystallized glass has a crystallite diameter exceeding 1,000 Å, as calculated by Scherrer's formula in X-ray diffraction measurement.

3. The crystallized glass housing according to claim 1, wherein the crystallized glass has a compressive stress layer formed on the surface by chemical tempering treatment.

4. An electronic device which is accommodated in the crystallized glass housing as defined in claim 1.

5. The crystallized glass housing according to claim 1, wherein the crystallized glass does not contain MgO.

6. A crystallized glass housing made of crystallized glass, which is to accommodate an electronic device, said crystallized glass having a diffused transmittance of 15% or less in the entire light wavelength region of from 380 nm to 780 nm, as measured by using an integrated sphere, wherein the crystallized glass contains, as a color component, at least one member selected from the group consisting of metal elements of Co, Mn, Fe, Ni, Cu, Cr, V, Bi, Er, Sn, Ce, Pr, Eu, Nd and Ag in an amount of from 0.1 to 10% as represented by mol percentage based on metal oxides; and wherein, when transmitted light of a C light source to the crystallized glass formed into a flat plate having a thickness of 2 mm is measured, the transmitted light has x of from 0.3 to 0.4 and y of from 0.3 to 0.4 in CIE chromaticity coordinates, and when reflected light of a C light source to the crystallized glass formed into a flat plate having a thickness of 2 mm is measured, the reflected light has x and y outside the range of the x and y of the transmitted light in CIE chromaticity coordinates.

7. The crystallized glass housing according to claim 6, wherein the crystallized glass has a crystallite diameter exceeding 1,000 Å, as calculated by Scherrer's formula in X-ray diffraction measurement.

8. The crystallized glass housing according to claim 6, wherein the crystallized glass has a compressive stress layer formed on the surface by chemical tempering treatment.

9. An electronic device which is accommodated in the crystallized glass housing as defined in claim 6.

10. The crystallized glass housing according to claim 6, wherein the crystallized glass does not contain MgO.

* * * * *